C. WAHLGREN.
LOAD BINDER.
APPLICATION FILED MAY 25, 1911.
1,008,503.
Patented Nov. 14, 1911.
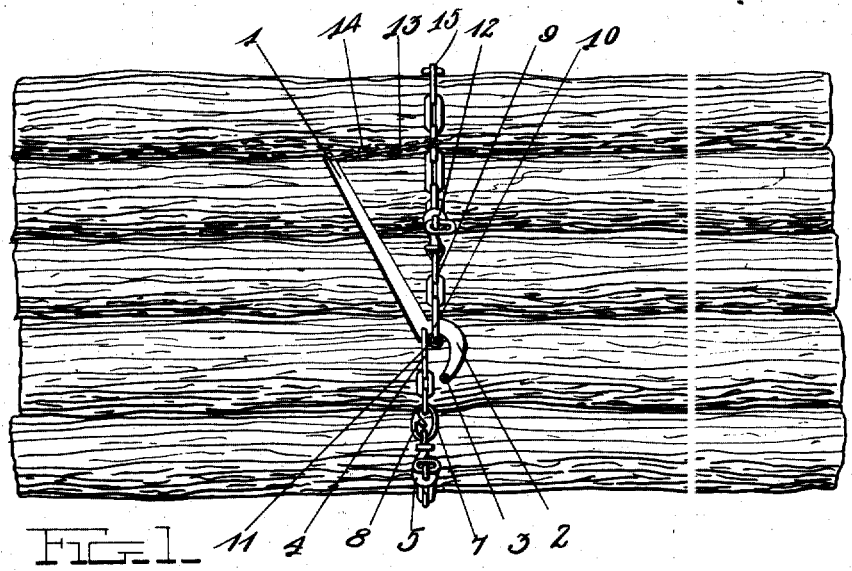
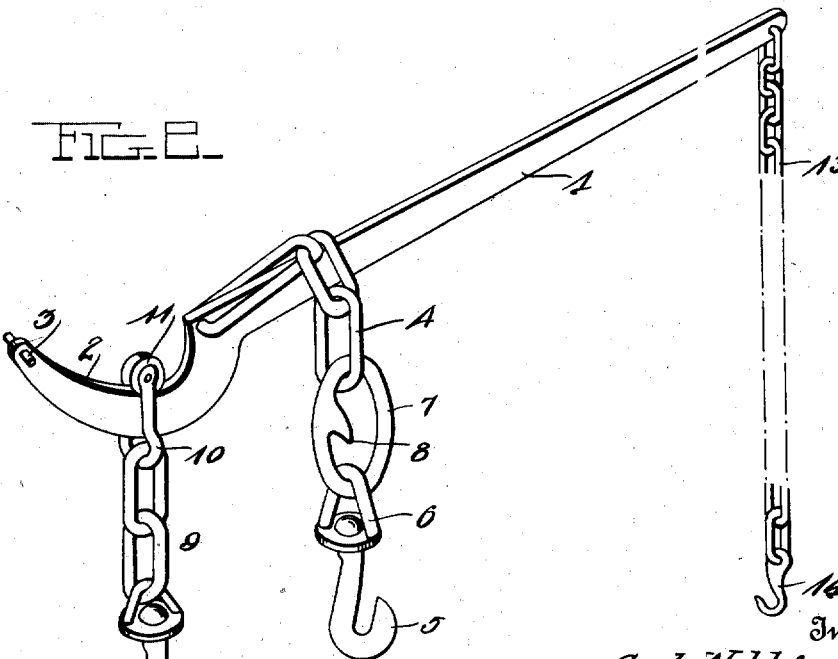
Inventor
Carl Wahlgren.
by H. B. Wilson & Co.
Attorneys
Witnesses
J. R. Pierce
O. B. Hopkins

UNITED STATES PATENT OFFICE.

CARL WAHLGREN, OF ROBINSON, COLORADO.

LOAD-BINDER.

1,008,503.  Specification of Letters Patent.  Patented Nov. 14, 1911.

Application filed May 25, 1911. Serial No. 629,413.

*To all whom it may concern:*

Be it known that I, CARL WAHLGREN, a subject of the Kingdom of Sweden, residing at Robinson, in the county of Summit and State of Colorado, have invented certain new and useful Improvements in Load-Binders; and I do declare the following to be a full, clear, and exact description of the invention, such as will enable others skilled in the art to which it appertains to make and use the same.

This invention relates to an improved log or load binder.

The object of the invention is to provide a simply constructed and efficient device of this class including a lever provided with means which adjusts itself to tighten the chain around the load as the lever is drawn into closed position.

With these and other objects in view, the invention consists of certain novel features of construction, and the combination and arrangement of parts as will be more fully described and claimed.

In the accompanying drawings:—Figure 1 represents a top plan view showing this device applied. Fig. 2 is a perspective view of the binder detached.

In the embodiment illustrated, a lever 1 is shown having one end curved or hook-shaped, as shown at 2, and in the free end of which is arranged a key 3 which projects laterally on opposite sides thereof for a purpose to be described. A short chain 4 has one link thereof secured to the inner end of said hook member 2 and this chain is provided at its free end with a grab hook 5 which is swiveled to an eye 6. This eye 6 is connected with a peculiarly constructed chain link 7 which is adapted for shortening or lengthening the chain 4. This link 7 is provided on the inner face of one side member thereof with an obliquely disposed hook 8, with which one of the chain links is designed to be engaged when it is desired to shorten the chain 4 after the binder has been arranged in operative position on the load and when only a slight adjustment is required. A short chain 9 is loosely mounted on the hook member 2 by means of a link 10 having a roller 11 thereon which is engaged with the inner edge or face of the hook 2, said hook 2 extending through the link 10 and being held against accidental disengagement by means of the key 3. A grab hook 12 is also connected with this chain 10 being preferably swiveled thereto in the same manner as the hook 5. This swiveled connection of the hooks provides for their being turned in any position after the movable roller 1 on the hook 2 adjusts itself on said hook to tighten the chain around the load when the lever is drawn into closed position as shown in Fig. 1. A chain 13 is connected at one end to the free end of the handle of the lever and is provided at its other end with a hook 14 which is adapted to be engaged with one of the links of the binding element 15 when the lever has been drawn into closed position and thereby lock said lever in this position against accidental opening thereof which would cause the release of the load as is shown clearly in Fig. 1.

In the operation of the device, the binding element or chain 15 is first engaged at one end with the grab hook 5 and is then placed around the load with the lever 1 swung open in the position shown in dotted lines in Fig. 1. The chain 15 is then adjusted or drawn close around the load and the grab hook 12 engaged with one of its links. The handle of the lever is then drawn back which causes the roller 11 to move inward on the hook member 2 and tighten the chain around the load and said lever is then locked in this position by the engagement of hook 14 on one chain 13 with one of the links of chain 15.

While this binder is shown applied to a load of logs, it is to be understood that it is not to be confined to such use but may be applied to any articles that can be bound in a load on any suitable carriage such as a wagon or sled.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

I claim as my invention:—

1. A load binder comprising a lever having a hook at one end, a grab hook connected with the inner end of said lever hook, a link having a roller movably mounted on the hook of said lever, means for preventing the accidental disengagement of said link from said lever hook, and a grab hook connected with said link.

2. A load binder including a lever having a longitudinally curved member at one end thereof with a key extending transversely through the free end of said curved member, a link mounted on said curved member and having a roller movably engaged therewith, a flexible element connected with said link, a grab hook swiveled to said flexible element, a flexible element connected with said lever at the inner end of said curved member and provided at its free end with a grab hook, and means for locking said member in operative position.

3. A load binder including a lever having a longitudinally curved member at one end thereof with a key extending transversely through the free end of said curved member, a link mounted on said curved member and having a roller movably engaged therewith, a flexible element connected with said link, a grab hook swiveled to said flexible element, a flexible element connected with said lever at the inner end of said curved member and provided at its free end with a grab hook, means for locking said member in operative position, a flexible binding element adapted to be engaged at opposite ends with said grab hooks, and means for varying the length of the flexible element connected with said lever.

4. A load binder including a lever having a longitudinally curved member at one end thereof with a key extending transversely through the free end of said curved member, a link mounted on said curved member and having a roller movably engaged therewith, a flexible element connected with said link, a grab hook swiveled to said flexible element, a flexible element connected with said lever at the inner end of said curved member and provided at its free end with a grab hook, means for locking said member in operative position, a flexible binding element adapted to be engaged at opposite ends with said grab hooks, and a link connected with one of said grab hooks and having an obliquely arranged inwardly extending projection for engagement with said flexible elements to vary the length thereof.

In testimony whereof I have hereunto set my hand in presence of two subscribing witnesses.

CARL WAHLGREN.

Witnesses:
W. F. FORMAN,
J. Z. DETWILER.

Copies of this patent may be obtained for five cents each, by addressing the "Commissioner of Patents, Washington, D. C."